United States Patent [19]

Hyche

[11] Patent Number: 5,439,968
[45] Date of Patent: Aug. 8, 1995

[54] FLUORESCENT PIGMENT CONCENTRATES

[75] Inventor: Kenneth W. Hyche, Kingsport, Tenn.

[73] Assignee: Eastman Chemical Company, Kingsport, Tenn.

[21] Appl. No.: 115,721

[22] Filed: Sep. 1, 1993

Related U.S. Application Data

[63] Continuation of Ser. No. 790,917, Nov. 13, 1991, abandoned.

[51] Int. Cl.6 ............................................. C08L 77/00
[52] U.S. Cl. ..................................... 524/504; 525/285; 252/301.16; 252/301.35
[58] Field of Search ...................... 252/301.16, 301.35; 525/285; 106/19; 524/504

[56] References Cited

U.S. PATENT DOCUMENTS

| | | | |
|---|---|---|---|
| 2,119,189 | 5/1938 | Widmer | 134/58 |
| 3,915,884 | 10/1975 | Kazenas | 252/301.2 |
| 3,922,232 | 11/1975 | Schein | 252/301.2 R |
| 4,369,272 | 1/1983 | Jaffe | 524/88 |
| 4,466,900 | 8/1984 | Horlacher et al. | 252/301.23 |
| 4,537,929 | 8/1985 | Nangrani | 524/504 |
| 4,820,760 | 4/1989 | Ali et al. | 524/423 |
| 4,911,830 | 3/1990 | Bromley et al. | 252/301.16 |
| 5,094,777 | 3/1992 | DiPietro | 252/301.35 |
| 5,140,059 | 8/1992 | Simoens | 524/504 |
| 5,145,891 | 9/1992 | Yasakawa et al. | 524/34 |

FOREIGN PATENT DOCUMENTS

0422474A2 4/1991 European Pat. Off.
906973 9/1962 United Kingdom.

*Primary Examiner*—Paul Lieberman
*Assistant Examiner*—Margaret Einsmann
*Attorney, Agent, or Firm*—Karen A. Harding; Harry J. Gwinnell

[57] ABSTRACT

Disclosed are low plate-out fluorescent pigment concentrates comprising:

(a) a pigment comprising a polyamide and a fluorescent dye and
(b) a carboxylated polyolefin consisting essentially of polyethylene or polypropylene which contains pendant acid or anhydride residue groups in the amount of about 0.25% to about 10% by weight based on the weight of the polyolefin.

4 Claims, No Drawings

FLUORESCENT PIGMENT CONCENTRATES

This is a continuation of application Ser. No. 07/790,917 filed on Nov. 13, 1991, now abandoned.

TECHNICAL FIELD

This invention relates to fluorescent pigment concentrates for use in a variety of polymers. The concentrates incorporate a carboxylated polyolefin which provides improved resistance to plate-out.

BACKGROUND OF THE INVENTION

Fluorescent pigments or daylight fluorescent pigments have been produced commercially since the late 1940's for use in paints, printing inks, and plastics. US patent literature from 1938 forward describes the preparation and use of various fluorescent pigments. Patton, in his Pigment Handbook, (Volume 1, pp 891–903) describes the chemistry, the production, the properties, the major uses, and some of the limitations of fluorescent pigments. An early advancement in the use of fluorescent colorants for plastics is described in U.S. Pat. No. 2,119,189 in which Widmer taught the use of a resinous molecule as a carrier or suitable medium for fluorescent dyes. Later, Switzer, Kazenas, and others utilized extremely friable organic glass-like compounds as carriers for fluorescent dyes. These glass-like compounds included modified sulphonamide resins, ureamelamines, glyceryl phthalates, polyesters, polyamides, vinyl resins, and silica gels.

U.S. Pat. No. 3,922,232 describes a fluorescent colorant comprising particles of a resinous precondensate colored with a fluorescent dye. The precondensate consists of 0.5 to 2 molecules of a carboxylic acid, ester, or anhydride and one mole of a polyhydroxy compound. It is mentioned that additives, such as polyethylene wax and ethylene-acrylic acid copolymers, can be added to the precondensate or to the final colorant. The final colorant is useful for coloring polyethylene.

U.S. Pat. No. 4,911,830 teaches the preparation of fluorescent pigment concentrates by mixing about 5 to 40 wt % fluorescent pigment, 5 to 20 wt % inorganic fillers, 2 to 10% silica gel or precipitated silica, 1 to 10% dispersant comprising at least 2 of (a) oxidized polyethylene wax, (b) unoxidized polyethylene wax, (c) ethylene-acrylic acid copolymers, and (d) bivalent metal salts of (a) or (c) and the remainder an ethylene polymer of substantially higher molecular weight up to 50% by weight. Certain types of fluorescent pigments, especially those useful at elevated temperatures, were not effective using this composition, resulting in excessive plate-out.

Although several advancements have been made in the state of the art for the use of fluorescent pigments to color plastics, most commercial fluorescent pigment concentrates continue to have only limited compatibility with a wide range of plastics. This limited compatibility results in many plate-out problems during the compounding of the concentrates and during the extrusion and molding of fluorescent pigmented products.

The detailed explanation of fluorescents and the chemistry involved is outside the scope of this discussion. However, an excellent description is given by Patton in his pigment Handbook, Volume 1, pp 891–903. Many daylight fluorescent dyes are based on aromatic structures such as the xanthenes, rhodamines, aminonaphthalimides, perinones, and thioindigos.

Fluorescent dyes usually must be in dilute solution in order to fluoresce. Excessive concentration levels sometimes results in a quenching of the fluorescence due to molecular collisions, reabsorption of emitted light, and other interactions. If the dyes are stabilized within a rigid glass-like resin, the undesirable deactivation is greatly reduced. Certain resin matrices are preferred for this immobilization of the dye molecules since these resins not only contribute more intense fluorescence, but also provide greater fade and thermal resistance. An example of this glass-like resin medium is one formed by cocondensing a toluene sulfone amide-formaldehyde within a triazine such as melamine or benzoguanamine.

The use of fluorescent pigments in plastics has been slow to develop because of plate-out problems during pigment compounding and during subsequent extruding and molding operations. Plate-out is the undesirable separation of the pigment from the base plastic and its deposition on screws and other metal processing equipment. This phase separation results from the extreme incompatibility of the fluorescent pigment binder and the plastic to be colored. Another limiting factor in the growth of fluorescent colorants in plastics is the relatively poor heat resistance of the glass-like binders for these pigments. Most commercially available fluorescent pigments can withstand temperatures up to 425° F. for only a very short time. High shear processing conditions which exist in many plastic compounding operations also adversely affect the color stability of many fluorescent pigments.

DESCRIPTION OF THE INVENTION

According to the present invention, there are provided low plate-out fluorescent pigment concentrate comprising:

(a) a pigment comprising a polyamide and a fluorescent dye and (b) a carboxylated polyolefin consisting essentially of polyethylene or polypropylene having a molecular weight of about 1,000 to about 100,000, the polyolefin containing pendant acid or anhydride residue groups in the amount of about 0.25% to about 10% by weight based on the weight of the polyolefin, and the polyolefin being present in sufficient amount to disperse the pigment.

The polyamide or modified polyamide which is used in the fluorescent pigment may be any of the conventional thermoplastic polymers having a melting point of 60°–200° C. Polyamides are well known in the art, and are the reaction products of dicarboxylic acids or amino acids and diamines. Typical dicarboxylic acids are those having 6 to 12 carbon atoms. Typical diamines are those having 6 to 12 carbon atoms. The acid or diamine may be substituted with conventional substituents such as, for example, alkyl from one to 12 carbons. Typical preferred polyamides include nylon 6, nylon 66, nylon 610 and nylon 11. "Polyamide" is intended to include such substituted polyamides. The polymeramide may have a molecular weight of 500 to 100,000. Conventional, well-known processes are used in preparing the polyamides.

The fluorescent pigment can be present in an amount of about 5 to about 50 wt %, and preferably about 20 to about 40 wt %, based upon the total weight of the concentrate. They must also be sufficiently heat stable. Combinations of two or more fluorescent pigments can be used.

Fluorescent pigments are also referred to as daylight fluorescent colors. The term pigment by definition it is understood to mean pure unextended inorganic or organic colorants which, unlike dyes, are insoluble in solvents of all kinds. Daylight fluorescent colors with few exceptions are really not true pigments but are instead solid solutions of fluorescent dyes in transparent synthetic resins which are finely ground to a particle size in the range of 2 to 5 microns. These pigments could alternatively be described as transparent plastic materials, colored with fluorescent dyes. They contain fluorescent dyes of the type, for example, 4-amino--naphthalimide (yellow) or rhodamine (red-blue/red) singly or blended together. There are no genuine blue or green fluorescent dyes; for these, phthalocyanine pigments combined with optical brighteners or with yellow fluorescent dyes are employed, yielding shades which, though clearly more brilliant than those obtained with normal pigments, do not however attain the luminosity of other fluorescent pigments.

The fluorescent pigments can be said to be fluorescent dyes in molecular solution in the carrier resin.

Examples of fluorescent dyes useful in preparing the fluorescent pigments are the fluorescent brighteners containing sulfo groups, in particular stilbene fluorescent brighteners, especially those of the type of the bis-triazinylaminostilbenedisulfonic acids, the bis-styrylbiphenyls, the bis-styrylbenzenes and the bis-triazolylstilbenedisulfonic acids. The fluorescent brighteners containing sulfonic acid groups can be in the form of their metal salts, for example, lithium, potassium, magnesium or sodium salts, and also ammonium, amine or alkanolamine salts. Fluorescent brightener compounds which have been partially acidified or fluorescent brighteners in the form of the free acid can be used. Any of the fluorescent brighteners containing sulfo groups of U.S. Pat. No. 4,466,900 can be used, which is incorporated herein by reference.

Other examples of fluorescent dyes which can be used to prepare the fluorescent pigments are the fluorescent naphthalimide dyes for example, Morton Fluorescent Yellow G (Color Index 75), Fluorol 7GA (Color Index-Fluorescent brightening agent 75), Calcofluor Yellow (Color Index-Fluorescent brightening agent No. 4) and Azosol Brilliant Yellow 6 GF (Color Index-Solvent Yellow 44), and the fluorescent cuomarin dyes, for example, Calcofluor White RW (Color Index fluorescent brightening agent 68) and Blancophor White AW (Color Index-Fluorescent brightening agent 68). Other useful fluorescent dyes include Rhodanine B, Rhodanine 6 GDN, Auramine, Eosine G, Calcofluor White ST, Pontamine White RT, Pontamine White BTS, Rhodamine Bx, Phthalocyamine, Alkali Blue G, Phthalocyamine, Rhoamine 7G, Rhodamine FB, Rhodamine S, Rhodamine 5G, Bright Yellow 3G, Tetramethyl Rhodamine, Rhodamine FG, Rhodamine F4G, Fanal Pink D, Fanal Violet D, Flexo Yellow 110, Lumogen Yellow D, Fluorol Green Gold, Fluorol Yellow and Thermoplast F-Orange.

The preferred fluorescent pigments are those based on polyamides from Day-Glo Color Company.

The fluorescent pigments can be prepared with the aid of dyeing assistants.

In contrast to normal pigments, the fastness to light of fluorescent pigments is only moderate. This is a result of the poor light fastness of the fluorescent colorants they contain; the carrier resins themselves being very stable to light. The addition of UV stabilizers, e.g., benzophenone and benzotriazole classes, gives marked improvements. Such products are frequently already present in the fluorescent pigments.

Many of the commercially available fluorescent pigments recommended for plastics are heat-stable only up to moderate temperatures because of the limited thermal stability of the carrier resins. These temperatures for short dwell times range between 180° and 230° C. according to the type of carrier resin and its degree of cross-linking. Processing temperatures in such range suffice for the final plastic products where they are molded at a temperature of up to 425° F., and preferably 400° F. (about 205° C.) or less.

The fluorescent pigments must not be subjected to too high of shear in the dry blending operation as it may adversely effect the color characteristics of the fluorescent pigments.

Useful homo or copolymers of α-olefins include low molecular weight polyethylene, crystalline polypropylene, amorphous polypropylene, mixtures of crystalline and amorphous polypropylene, poly-1-butene, and propylene copolymers with one or more higher α-olefins. Useful higher α-olefins include 1-butene, 1-pentene, 1-hexene, 1-heptene, 1-octene, 1-decene, and 4-methyl-1-pentene.

The α-olefins are reacted using conventional techniques with at least one unsaturated acid or anhydride having 3 to 5 carbon atoms or a 1–10 carbon atom ester thereof. Preferred acids, anhydride, or esters include maleic anhydride, dimethyl maleate, acrylic acid, methacrylic acid, and crotonic acid.

The most preferred polyolefins containing pendant acid or anhydride residue groups are polyethylene and polypropylene containing pendant maleic anhydride residue groups.

The process for preparing the low plate-out fluorescent pigment concentrate involves:
  (I) dry blending the pigment and polyolefin, preferably using high intensity mixing conditions, but not subjecting the pigment particle surfaces to such high shear so as to materially effect the color characteristics of the pigment particles; and
  (II) melt mixing the dry blended mixture at a temperature of 425° F. or lower and optionally forming the melt mixed material into a form useful for fabrication. Preferably the forming of the melt-mixed material involves the steps of:
    (a) forming the melt-mixed materials into strands;
    (b) cooling the strands; and
    (c) pelletizing the strands.

The temperature during extrusion should not exceed 425° F.

In formulating the concentrate the ingredients are preferably in powder form and are in dry form.

The fluorescent pigment concentrates are dispersed in polymers in order to form molded articles containing fluorescent pigments. Any conventional dispersion or incorporation means, such as, a mixer, can be used.

The dispersions of polymer and fluorescent pigment concentrate are molded, using any conventional molder, into molded articles.

Generally, sufficient concentrate should be used to provide a concentration of from about 0.10 to about 2 wt % (based on the total weight of the final plastic product) of fluorescent pigment in the final plastic product.

The compositions used to form the final polymer products can contain the usual additives, such as, heat and/or light stabilizers. Some material which act as lubricants may adversely effect the plate-out characteristics.

EXAMPLE
BASIC FORMULATION

| | |
|---|---|
| Polyolefin Resin | 0–46% |
| Fluorescent Pigment | 35% |
| Filler (equal to or less than two microns average particle size) | 10% |
| TiO$_2$ | 2% |
| Silcron G-100 | 2% |
| Wax Dispersant | 5–51% |

Note: Inorganic material like barium sulfate or various clays.

Mixing Procedure

1. Weigh-out ingredients into high--intensity mixer
2. Mix on medium speed for 1 minute
3. Discharge material

Extrusion Procedure:

1. Set temperatures no higher than 425° F.
2. Extrude into strands
3. Run strands through water bath to cool
4. Run cooled strands through a pelletizer

Plate-Out Test:

1. Place 5.0 g of concentrate onto polished press plates
2. Put plates into press set at no more than 375° F.
3. Apply enough pressure to get a press-out of about 20 mils
4. Remove plates and cool in water bath
5. Remove pressed material and visually evaluate residue deposited onto plate
6. Rating system:
    (a) Excellent (no plate-out)
    (b) Good (very little plate-out)
    (c) Moderate plate-out
    (d) Bad plate-out
    (e) Very bad plate-out The concentrates rating as OK in this work are rated no higher than a two. A rating of 3 is marginal, and ratings of 4 and 5 are considered to be unacceptable. All others are considered to have too much plate-out.

EXAMPLES

The following examples are submitted for a better understanding of the invention. E indicates ethylene and CO indicates carbon monoxide.

Example 1

Four hundred grams of a low molecular weight polyethylene wax (8,000 molecular weight, 0.906 density) was melted and held in a glass beaker at 250° F.

One hundred grams of fluorescent green pigment (Day-Glo S-16 orange) was added to the molten polyethylene wax and mixed thoroughly for five minutes using a Cowles mixer at 1800 rpm. After mixing, the molten composition was poured from the beaker onto a cool flat surface and cooled to room temperature. The resulting blend was examined visually for phase separation and compatibility. Compositions which appeared to be compatible were further let down into extrusion grade polypropylene (MFR 12, 0.90 density) at a let-down ratio of 24-parts polypropylene to 1-part pigment master batch and then extruded into 2-mil thick film. The resulting film was examined and rated for pigment dispersion.

Example 2

A composition similar to Example 1, except the low molecular weight wax is an oxidized polyethylene (2,000 molecular weight, 0,939 density, and 16 acid number).

Example 3

A composition similar to Example 1, except the low molecular weight wax is an ethylene-carbon monoxide copolymer (CO content 2,2%, 2,000 molecular weight, 1.0 density).

Example 4

A composition similar to Example 1, except the low molecular weight wax is an ethylene-carbon monoxide copolymer (CO content 8%, 2,000 molecular weight, 0.96 density).

Example 5

A composition similar to Example 1, except that the low molecular weight wax is an ethylene-carbon monoxide copolymer (CO content 14% 0.96 density, 3,000 molecular weight) .

Example 6

A composition similar to Example 1, except that the low molecular weight wax is an ethylene-carbon monoxide copolymer (CO content 21%, 1.0 density, 2,000 molecular weight).

Example 7

A composition similar to Example 1, except that the low molecular weight wax is an ethylene-carbon monoxide copolymer (CO content 31%, 1,500 molecular weight, 1.02 density).

Example 8

A composition similar to Example 1, except the low molecular weight wax is a polyethylene grafted with maleic anhydride (8,000 molecular weight, 0.908 density, 2–3 acid number).

Example 9

A composition similar to Example 1, except the low molecular weight wax is a polyethylene grafted with maleic anhydride (8,000 molecular weight, 0.918 density, 9.6 acid number).

Example 10

A composition similar to Example 1, except the low molecular weight wax is a crystalline polypropylene grafted with maleic anhydride (4,000 molecular weight, 0.934 density, 45 acid number).

Example 11

A comparison similar to Example 1, except the dispersant is crystalline polypropylene grafted with maleic anhydride (12,000 molecular weight, 0.940 density, 60 acid number).

Example 12

A composition similar to Example 1, except the dispersant is amorphous polypropylene grafted with maleic anhydride (4,000 molecular weight, 0.90 density, 42 acid number).

The substantially higher weight carrier plastic can, if desired, be the same resin as the final molded products, to be colored. The carrier plastics include polyolefins such as polyethylene, polypropylene; styrenics such as polystyrene, ABS, SAN, and block copolymers; and polyamides such as Nylon 6, Nylon 6,6, Nylon 12, Nylon 11, Nylon 6, 12.

The invention compositions may contain other additives normally found in color concentrates including inert fillers to provide opacity, UV stabilizers, and antioxidants. The inert fillers, which should have a particle size of 2 microns or less, include talc, clay, fumed silica, silica gel, titanium dioxide, barium sulfate, zinc oxide, and calcium carbonate and others.

The detailed explanation of fluorescences and the chemistry involved is outside the scope of this discussion. However, an excellent description is given by Patton in his Pigment Handbook, Volume 1, pp 891–903. Many daylight fluorescent dyes are based on aromatic structures such as the xanthenes, rhodamines, aminonaphthalimides, perinones, and thioindigos.

In Examples 1 and 2, the low molecular weight dispersant waxes were: an unmodified polyethylene, and an oxidized polyethylene. Both gave incompatible blends with the fluorescent pigment as evidenced by phase separation in the melt (see Table 1).

Examples 3 through 7 contained ethylene-carbon monoxide copolymers with 2, 8, 14, 21, and 30% CO content respectively. The compositions were incompatible and phase separated in the melt (see Table 1).

Examples 8 through 12 contained maleated polyethylene waxes, maleated crystalline polypropylene waxes, and a maleated amorphous polypropylene wax respectively. All these blends were compatible and did not phase separate in the melt (see Table 1).

Selected compositions from Examples 1 through 12 were let down into plastic grade polypropylene homopolymer (MFR 12, density 0.91) at a let down ratio of 24-parts polypropylene to 1-part fluorescent concentrate. The resulting blends were extruded into 2-mil film and examined for pigment dispersion and plate-out problems. As indicated in Table 2, film containing non-maleated wax dispersants exhibited only fair to poor pigment dispersion and considerable plate-out problems. Conversely, film containing maleated wax dispersants (Examples 8–12) exhibited excellent pigment dispersion with no evidence of plate-out. As used herein, "I" means incompatible and "C" means compatible.

TABLE 1

Compatibilities of Low Molecular Weight Polyolefins with Fluorescent Pigments*

| Polyolefin | Compatibility Polyolefin/Pigment Ratio, (4:1) | | |
|---|---|---|---|
| | S-16 Pigment | Z-18 Pigment | NX-15 Pigment |
| Ex. 1 Epolene C-10 Wax | I | I | I |
| Ex. 2 Epolene E-14 Wax | I | I | I |
| Ex. 3 ECO (2.2% CO) | I | I | I |
| Ex. 4 ECO (9% CO) | I | I | I |
| Ex. 5 ECO (14% CO) | I | I | I |
| Ex. 6 ECO (21% CO) | I | I | I |
| Ex. 7 ECO (31% CO) | I | I | I |
| Ex. 8 Epolene C-16 Wax | C | C | C |
| Ex. 9 Epolene L-630-130 Wax | C | C | C |
| Ex. 10 Epolone E-43 Wax | C | C | C |
| Ex. 11 P-1689-002 Crystalline PP | C | C | C |
| Ex. 12 P-1824-004 Amorphous PP | C | C | C |

*Day-Glo S-16 Orange, Z-18 Signal Green, NX-15 Orange, all based on polyamide or modified polyamide carrier resins.

TABLE 2

Polypropylene Film Blends*

| Materials | Parts by Wt. | | | | | | |
|---|---|---|---|---|---|---|---|
| | 1 | 6 | 8 | 9 | 10 | 11 | 12 |
| Example 1 Concentrate | 1 | | | | | | |
| Example 6 Concentrate | | 1 | | | | | |
| Example 8 Concentrate | | | 1 | | | | |
| Example 9 Concentrate | | | | 1 | | | |
| Example 10 Concentrate | | | | | 1 | | |
| Example 11 Concentrate | | | | | | 1 | |
| Example 12 Concentrate | | | | | | | 1 |
| Polypropylene (12 MFR 0.91 density) | 24 | 24 | 24 | 24 | 24 | 24 | 24 |
| Film Properties | | | | | | | |
| Pigment Dispersion | Poor | Poor | Fair | Exc | Exc | Exc | Exc |
| Plate Out | Severe | Severe | Severe | None | None | None | None |

*Films prepared using Day-Glo NX-15 fluorescent pigment.

The invention has been described in detail with particular reference to Preferred embodiments thereof, but it will be understood that variations and modifications can be effected within the spirit and scope of the invention.

I claim:

1. A low plate-out fluorescent pigment concentrate comprising:
   (a) a pigment comprising a polyamide and a fluorescent dye and
   (b) the reaction product of (1) polyethylene or polypropylene having a molecular weight of about 1,000 to about 100,000 with (2) maleic acid or anhydride or dimethyl maleate said reaction product being present in sufficient amount to disperse said pigment.

2. A concentrate according to claim 1 wherein said pigment and said reaction product are each present in an amount of about 5–50% by weight based on the weight of the concentrate.

3. A concentrate according to claim 1 which contains, in addition, up to about 50% by weight of a compatible thermoplastic polymer as a carrier.

4. A concentrate according to claim 3 wherein said thermoplastic polymer is selected from the group consisting of polyethylene, polypropylene, polystyrene, polystyrene copolymers and terpolymers, and polyamides.

* * * * *